Patented July 23, 1940

2,208,569

UNITED STATES PATENT OFFICE 2,208,569

PREPARATION OF MIXED CELLULOSE ESTERS CONTAINING A SUBSTANTIAL AMOUNT OF PROPIONYL OR BUTYRYL

Loring W. Blanchard, Jr., Rochester, N. Y., assignor to Eastman Kodak Company, Rochester, N. Y., a corporation of New Jersey No Drawing. Application December 18, 1937, Serial No. 180,602

6 Claims. (Cl. 260—225)

This invention relates to the preparation of cellulose acetate-propionate or cellulose acetate-butyrate with an esterification bath, at least 60% of the total acyl content of which consists of propionyl and/or butyryl, in which bath not more than five parts of fatty acid are present, for each part of cellulose, and the ester so prepared.

In the preparation of cellulose acetate-propionate or cellulose acetate-butyrate, with an esterification bath containing at least 60% of propionyl or butyryl based on the total acyl, many difficulties are involved due to the sluggishness of the reaction mixture. As a consequence, the viscosity of the cellulose is detrimentally lowered before sufficient esterification has occurred to protect it from the degrading influences present in the reaction mixture. If the various known means of speeding up the reaction, such as the use of heat or increasing the amount of catalyst, are applied, the degrading tendency of the reaction mixture is increased and, although the time of reaction is shortened, the rate of lowering of the viscosity is accelerated.

Various methods have been proposed for making cellulose acetate-propionates and cellulose acetate-butyrates but, in every case, either a high acetyl ester was prepared, or the amount of diluent present was so great that the viscosity of the ester was excessively lowered. Also, in some cases of preparing high propionyl or high butyryl esters, the cellulose has been pretreated with glacial acetic acid containing a catalyst. These processes all result in the preparation of cellulose esters in which the viscosity is excessively lowered.

One object of my invention is to prepare mixed esters of cellulose having a high content of propionyl or butyryl. Another object of my invention is to provide a method of preparing those esters in which the cellulose is not excessively broken down. A further object of my invention is to provide mixed esters having a high content of propionyl or butyryl, which esters have a sufficiently high viscosity to make them useful for preparing flexible sheeting or artificial yarn therefrom.

I have found that, if cellulose is pretreated in a catalyst-free fatty acid bath of at least 90% concentration, in which at least 40% of the fatty acid present is acetic acid, and this cellulose is then esterified in a reaction mixture containing not more than five parts of fatty acid to one part of cellulose, at least 60% or more of propionyl or butyryl, based on the total acyl content of the esterifying bath, and 3-8% (based on the cellulose) of sulfuric acid catalyst, a product of higher viscosity is obtained than would be obtained in any of the processes of the prior art. I have found that, by decreasing the amount of fatty acid, which is the only solvent present in the esterification bath, the concentration of the anhydride is increased so that, even though propionic or butyric anhydride is employed therein, the reaction is speeded up and approaches that which would be obtained if acetic anhydride were used. This more rapid esterification adds sufficient acyl groups to the cellulose, in the early stages of the esterification, to protect it from excessive viscosity reduction by the sulfuric acid or other catalyst which may be present and, thus, the final product has a good viscosity. Also, my process results in the use of a shorter reaction time and thereby increases the yield possible per acylation vessel. The esters prepared by my process are markedly free from fiber and grain and, therefore, are good quality esters having a high clarity.

The cellulose acetate-propionates and cellulose acetate-butyrates, obtained by my process, have viscosities from 200 cps. to 4000 cps. in a 10% solution in acetone at 25° C. Sheeting may be prepared from these esters by dissolving them in acetone, ethylene chloride or propylene chloride, or their mixtures with a small amount of alcohol, if soluble therein, and coating them out onto a film forming surface. These esters may also be employed for laminating with glass, metal, wood or other material, preferably in sheet form. Due to the clarity of the solution of these esters, the sheeting prepared therefrom is especially desirable in the making of laminated glass or photographic film, in which a high degree of clarity is very desirable.

In processes in accordance with my invention, the maximum temperature should be between 70° and 110° F., and preferably between 80° and 100° F. For the higher viscosity esters, the maximum temperature reached in the reaction should not exceed 80° F. and, in the preparation of the medium viscosity esters, a maximum temperature of 100° F. would be sufficient in most cases.

The amount of sulfuric acid employed is preferably kept as low as possible to obtain a good acetylation at the temperature employed. For the preparation of the higher viscosity esters, in which a low maximum temperature is employed, 5–6% of the sulfuric acid is usually sufficient. For the medium viscosity esters, in which a higher maximum temperature is permissible, 3–5% of sulfuric acid is usually sufficient. If desired, phosphoric acid may supplement the sulfuric acid which is employed.

In the preparation of the medium viscosity esters, the use of not more than 3-4% of sulfuric acid is preferred. With higher percentages of sulfuric acid, in the preparation of the medium viscosity esters, a tendency towards introducing more sulfur into the product and lowering of its heat stability is present. Also, in using the higher temperature, such as 110° F., the viscosity of the product will usually be lower with the use of a higher percentage of sulfuric acid catalyst. It is to be understood that the percentages of sulfuric acid in this specification are based on the weight of the cellulose.

It is preferable that at least three parts of fatty acid be present in the esterification bath for each part of cellulose, although this lower limit is governed by the type of ester being prepared and the amount of excess anhydride present. If a medium viscosity ester is being prepared, it is not necessary that as much solvent be present to dissolve it as with the higher viscosity esters and, therefore, in some cases, as low as two parts of fatty acid might be employed for each part of cellulose. Obviously, if a large excess of anhydride is employed, the proportion of fatty acid present need not be so great to obtain solution. It is of advantage that not more than a slight excess of anhydride over that required to react with the cellulose be employed as, in this way, the generation of heat when the excess anhydride is destroyed by the addition of water or dilute acid, after the reaction has occurred, is maintained at a minimum and, thus, any danger of seriously lowering the viscosity at this point is avoided.

If some other solvent diluent is used, the proportion of fatty acid should be restricted so that the total amount of diluent employed is not more than five parts to one part of cellulose. Some solvent diluents which have been suggested for use in esterification processes are: ethylene chloride, methylene chloride, chloracetic acid and methoxy-acetic acid.

The propionyl and/or butyryl content in the esterification bath should be at least 60%, based on the total acyl. If a proportion in the neighborhood of 60% of acyl groups of 3-4 carbon atoms (based on total acyl) is used in the esterification bath, the resulting ester will contain approximately 20% propionyl and/or butyryl, based on the total ester, or approximately 40% based on the total acyl content. If approximately 90% of propionyl and/or butyryl, based on the total acyl in the bath, is employed, the proportion of propionyl and/or butyryl in the final product, based on the total acyl, will be approximately 80%. The product, made in accordance with my invention, will be of good clarity, showing the absence of poorly acylated or unacylated fibers and will have a viscosity of at least 200 centipoises in a 10% solution in acetone at 25° C., showing the absence of an excessive lowering of viscosity in the esterification.

Due to the increased effectiveness of the propionic or butyric anhydride employed in the esterification of the cellulose, not only is an ester of good viscosity and high clarity obtained, but the time of the esterification is speeded up by at least one-third, and usually more, over the time required in a similar esterification using a greater amount of solvent.

Because of the avoidance of an excessive lowering of viscosity, my process is particularly adapted to prepare cellulose esters of high viscosity, such as 2,000 to 4,000 centipoises. These high viscosity esters may be obtained, by my process, from cellulose having the same cuprammonium viscosity as that of the cellulose ordinarily employed as the starting material in the making of cellulose organic esters. Although cotton linters are preferred for the starting material, other esterifiable cellulosic materials may be employed. For instance, refined wood pulp, such as high alpha sulfite pulp, may be used advantageously. It will be found that, regardless of the cellulose used, the viscosity of the resulting product will be high, compared with a similar process in which the proportion of solvent is not limited. To obtain cellulose esters of good viscosity, it is desirable that an undegraded cellulose material be employed. For this reason, it is desirable that the pretreatment bath be substantially free of catalyst, particularly sulfuric acid, so that the viscosity of the cellulose will not have been adversely affected prior to its esterification.

The following examples illustrate processes embodying my invention:

*Example I*

30 pounds of refined cotton linters were treated with 60 pounds of glacial acetic acid for four hours at 120° F. 105 pounds of 98% propionic anhydride and 55 pounds of propionic acid were added as the mass was cooled to 50° F. A solution of 448 cc. of sulfuric acid in 20 pounds of propionic acid was then added. The temperature was allowed to rise to 70° F. and kept at 70-80° F. Nine hours after the addition of the sulfuric acid catalyst, the reaction was finished. A batch of excellent appearance was obtained. A mixture of 36 pounds of water and 72 pounds of acetic acid was then added and the cellulose ester was hydrolyzed by maintaining the mass at 100° F. for 36 hours. The ester was then precipitated, washed and dried. It exhibited a viscosity of 2470 centipoises in a 10% solution in acetone at 25° C.

*Example II*

Three pounds of refined cotton linters were treated with three pounds of glacial acetic acid for four hours at 110° F. A mixture of 9.2 pounds of butyric acid, 4.8 pounds of butyric anhydride (95%) and five pounds of acetic anhydride (95%) was added as the mixer, containing the mass, was cooled to 50° F. A solution of 44.8 cc. of sulfuric acid in two pounds of butyric acid was added. The temperature was allowed to rise to 80° F. and was kept at that temperature. Eight and one-half hours after the addition of the sulfuric acid catalyst, the reaction was finished. A mixture of 3.6 pounds of water and 7.2 pounds of acetic acid was added and the cellulose ester was hydrolyzed by maintaining the mass at 100° F. for 36 hours. The cellulose ester was precipitated out, washed and dried. In both cases, cellulose esters of high viscosity and of good clarity, when dissolved in acetone, were obtained. The ester made in accordance with this example had a viscosity of 3,200 centipoises in a 10% solution of acetone at 25° C.

The pretreatment of the cellulose may be carried out in accordance with that described and claimed in Malm application Serial No. 81,323, filed May 22, 1936, by putting the cellulose in sheet form and passing it over a roll moistened with acetic acid or with a pretreatment mixture within the limits described above and allowing it to stand until the cellulose is sufficiently activated. In the pretreatment, it is necessary that the pretreatment liquid be well distributed through the cellulose material, so that the treatment is uniform. It is also necessary that the pretreatment bath be catalyst-free, so as to swell the cellulose without adversely affecting its viscosity.

It is preferred that the pretreatment bath be concentrated acid, that is, contain at least 90% of acid. The use of more dilute acid, if aqueous, is not economical, due to the tendency of the water to destroy anhydride in the esterification. If, however, the diluent is inert, this disadvantage is not present.

As my process makes possible the esterification of cellulose in a bath containing a high percentage of propionyl or butyryl, without breaking down the cellulose, it is particularly directed to making cellulose esters having high or moderately high viscosities, together with high propionyl and/or butyryl contents. The esters made in accordance with my invention are of value, either hydrolyzed or unhydrolyzed, for the making of sheeting or film by coating out a solution of the same in acetone, or an alkylene chloride, such as ethylene chloride on a film-forming surface. The sheeting thus prepared may be employed in the making of photographic film, laminated glass or for any purpose where a clear, flexible, moisture-resistant sheet finds use.

The esters made in accordance with my invention may be employed in any connection wherein an ester of the viscosities obtained is suitable for use. These esters exhibit good resistance to moisture and are amenable to the solvent action of a large number of solvents.

I claim:

1. A process of preparing cellulose actate-propionate, which comprises treating 100 parts of cotton linters with 200 parts of glacial acetic acid for four hours at approximately 170° F., then adding a mixture of 350 parts of propionic anhydride and 185 parts of propionic acid as the mass is cooled to approximately 50° F. and, then, adding a solution of six parts of sulfuric acid in 67 parts of propionic acid, allowing the temperature to rise to 70° F. and maintaining it between 70–80° F. until the reaction is completed.

2. A process of preparing a high viscosity mixed ester of cellulose which comprises treating 100 parts of cellulose with 200 parts of glacial acetic acid for four hours at approximately 170° F., adding a mixture of 185 parts of a fatty acid of 3–4 carbon atoms and 350 parts of an anhydride of such an acid, as the mass is cooled to approximately 50° F. and then adding a solution of 6 parts of sulfuric acid in 67 parts of a fatty acid of 3–4 carbon atoms, allowing the temperature to rise to 70° F. and maintaining it between 70–80° F. until the reaction is completed.

3. A process of preparing a high viscosity mixed ester of cellulose having a propionyl and butyryl content of at least 20% which comprises activating the cellulose with a catalyst-free fatty acid bath containing at least 40% of acetic acid, adding a mixture of fatty acid of 3–4 carbon atoms and the anhydride of such acid, as the mass is cooled to approximately 50° F., the anhydride being in an amount slightly in excess of theoretical, and then inducing esterification by adding a solution of 3–8% of sulfuric acid (based on the weight of the cellulose) in fatty acid of 3–4 carbon atoms, the amount of fatty acid supplied by the pretreatment and the subsequent additions being such that the esterification bath is a solvent for the cellulose ester to be formed, contains at least three and not more than five parts of fatty acid to one of cellulose so that at least 60% of the total acyl of the bath is propionyl and butyryl and allowing the temperature to rise to a maximum of 70–110° F., the maximum being selected inversely to the percentage of catalyst.

4. A process of preparing a high viscosity cellulose acetate butyrate having a butyryl content of at least 20% which comprises activating cellulose with a catalyst-free fatty acid bath containing at least 40% of acetic acid, adding a mixture of butyric acid and butyric anhydride thereto as the mass is cooled to approximately 50° F., the anhydride being an amount slightly in excess of theoretical, and then inducing esterification by adding a solution of 3–8% of sulfuric acid (based on the weight of the cellulose) in butyric acid, the amount of fatty acid supplied by the pretreatment and the subsequent additions being such that the esterification bath is a solvent for the cellulose ester to be formed, contains at least three and not more than five parts of fatty acid to one of cellulose and so that at least 60% of the total acyl of the bath is butyryl and allowing the temperature to rise to a maximum of 70–110° F., the maximum being selected inversely to the percentage of catalyst.

5. A process of preparing a high viscosity mixed ester of cellulose having a propionyl and butyryl content of at least 20% which comprises activating the cellulose with a catalyst-free fatty acid bath containing at least 40% of acetic acid, adding a mixture of fatty acid of 3–4 carbon atoms and the anhydride of such acid, as the mass is cooled to approximately 50° F., the anhydride being slightly in excess of theoretical, and then inducing esterification by adding a solution of 5–6% of sulfuric acid (based on the weight of the cellulose) in fatty acid of 3–4 carbon atoms, the amount of fatty acid supplied by the pretreatment and the subsequent additions being such that the esterification bath is a solvent for the cellulose ester to be formed, contains at least three and not more than five parts of fatty acid to one of cellulose and so that at least 60% of the total acyl of the bath is propionyl and butyryl and allowing the temperature to rise to 70° F. and maintaining it at 70–80° F. until the reaction is completed.

6. A process of preparing a high viscosity acetate butyrate of cellulose having a butyryl content of at least 20% which comprises activating the cellulose with a catalyst-free fatty acid bath containing at least 40% of acetic acid, adding a mixture of butyric acid and the anhydride of such acid, as the mass is cooled to approximately 50° F., the anhydride being slightly in excess of theoretical, and then inducing esterification by adding a solution of 5–6% of sulfuric acid (based on the weight of the cellulose) in butyric acid, the amount of fatty acid supplied by the pretreatment and the subsequent additions being such that the esterification bath is a solvent for the cellulose ester to be formed, contains at least three and not more than five parts of fatty acid to one of cellulose and so that at least 60% of the total acyl of the bath is butyryl, allowing the temperature to rise to 70° F. and maintaining it at 70–80° F. until the reaction is completed.

LORING W. BLANCHARD, Jr.